(12) United States Patent
Brault

(10) Patent No.: US 6,299,121 B1
(45) Date of Patent: Oct. 9, 2001

(54) DEVICE FOR FIXING A VEHICLE SEAT, VEHICLE SEAT HAVING SUCH A DEVICE AND A SLIDE BAR FOR SUCH A SEAT

(75) Inventor: Stephane Brault, Malesherbes (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/421,426

(22) Filed: Oct. 19, 1999

(30) Foreign Application Priority Data

Oct. 19, 1998 (FR) ................................................ 98 13072

(51) Int. Cl.[7] ............................................... F16M 13/00
(52) U.S. Cl. ........................................... 248/429; 297/341
(58) Field of Search ................................. 248/429, 432, 248/424, 430, 423; 296/65.1; 297/330, 344.1, 216.19, 195.1, 341

(56) References Cited

U.S. PATENT DOCUMENTS

| Re. 35,485 | * | 4/1997 | Stewart | 248/429 |
|---|---|---|---|---|
| 4,088,378 | * | 5/1978 | Pallant et al. | 248/429 X |
| 4,639,038 | * | 1/1987 | Heling | 297/341 |
| 5,020,853 | * | 6/1991 | Babbs | 297/341 |
| 5,275,370 | * | 1/1994 | Terai | 248/429 |
| 5,597,206 | * | 1/1997 | Ainsworth et al. | 297/378.12 |
| 5,848,775 | * | 12/1998 | Isomura et al. | 248/430 |
| 5,961,088 | * | 10/1999 | Chabanne et al. | 248/429 |
| 5,967,604 | * | 10/1999 | Yoghida et al. | 297/216.9 |
| 6,102,478 | * | 8/2000 | Christopher | 297/341 |
| 6,105,920 | * | 8/2000 | Gauger | 248/429 |
| 6,126,133 | * | 10/2000 | Timon et al. | 248/429 |

* cited by examiner

*Primary Examiner*—Ramon O. Ramirez
*Assistant Examiner*—Tan Le
(74) *Attorney, Agent, or Firm*—Marshall, Gerstein & Borun

(57) ABSTRACT

A fixing device is proposed for mounting the slide bars of a seat on a vehicle floor by means of vertical anchoring pins fixed to the floor. These anchoring pins are located in holes provided in the base of the fixed section of the slide bars and then blocked by sliding latches which are resiliently biased into their locked position. The latches are initially held unblocked by triggers and these triggers are moved back releasing the latches when the seat is positioned on the floor of the vehicle.

16 Claims, 5 Drawing Sheets

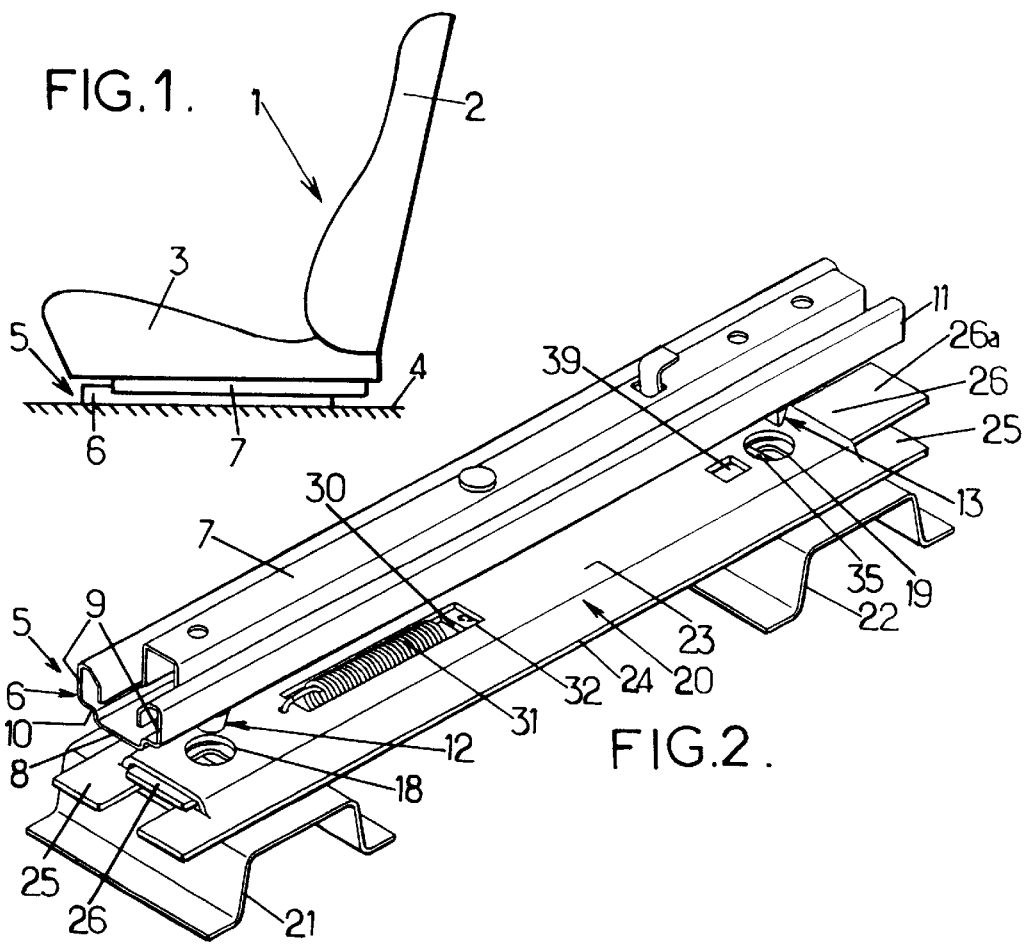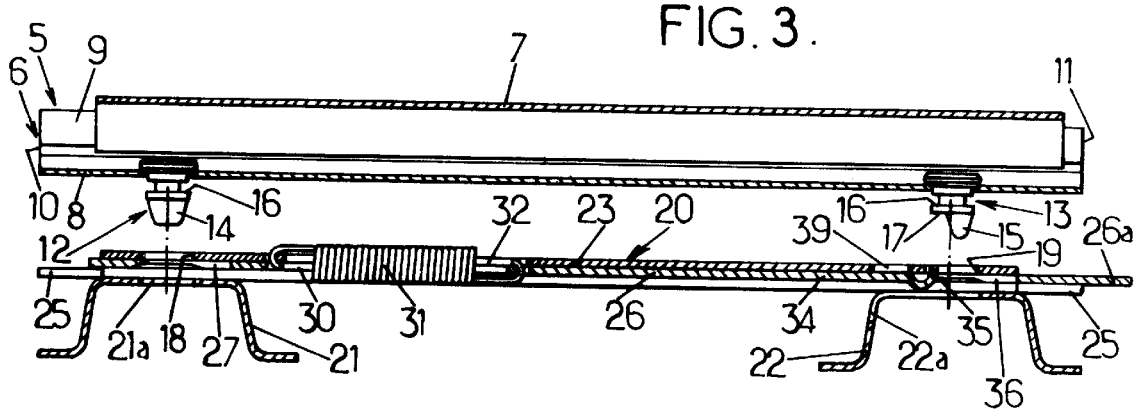

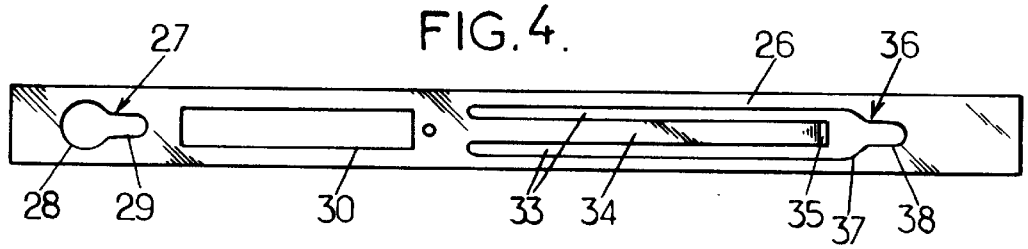
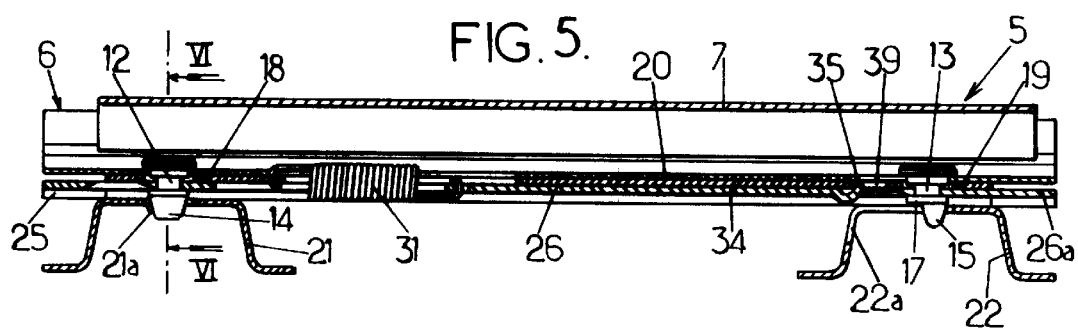
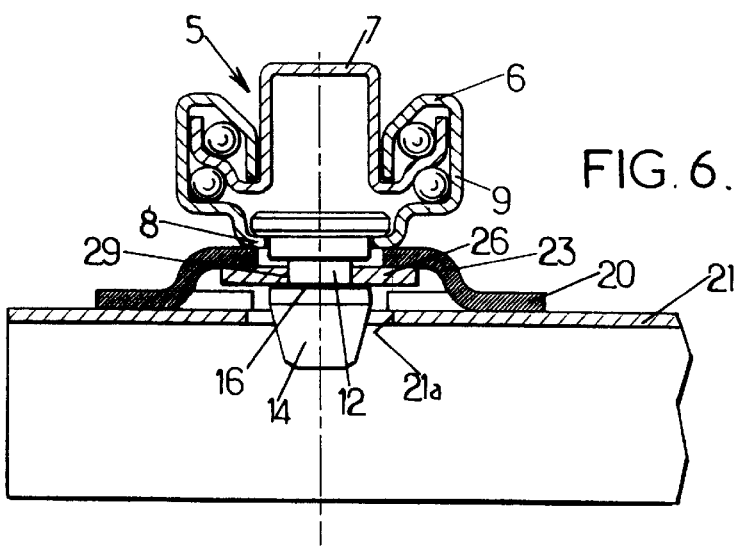
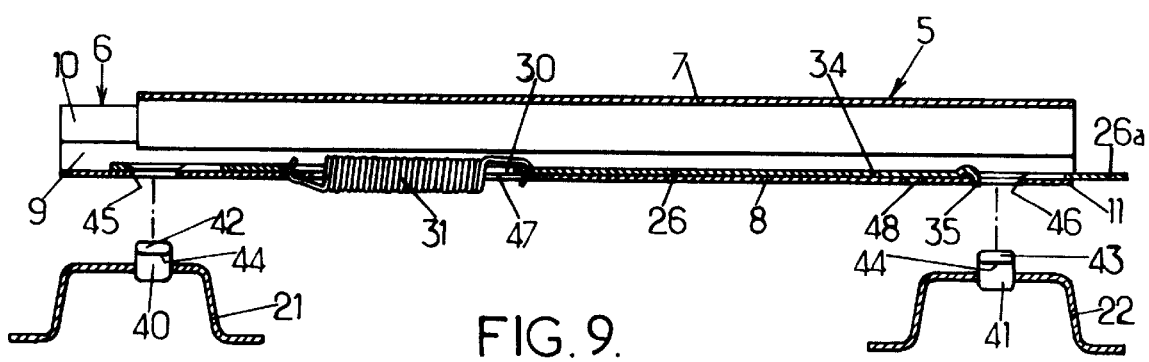

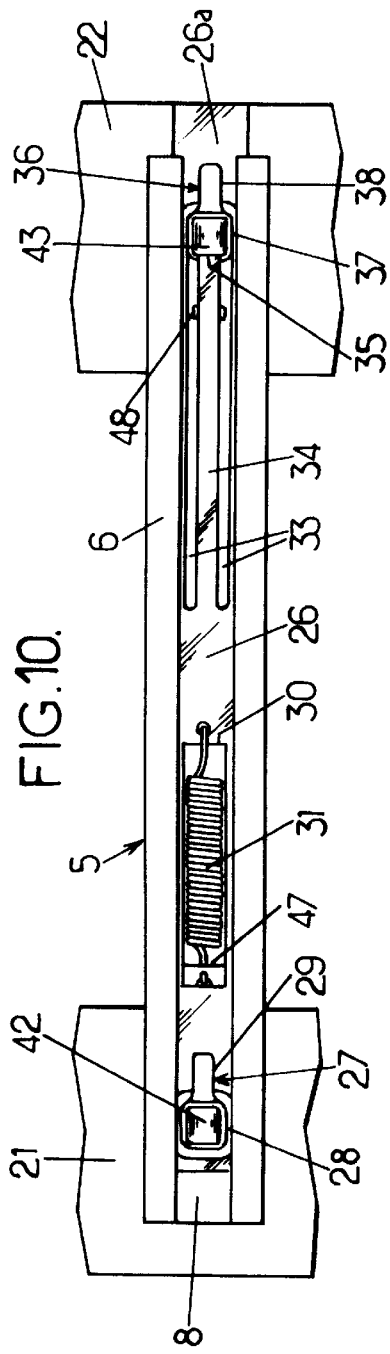
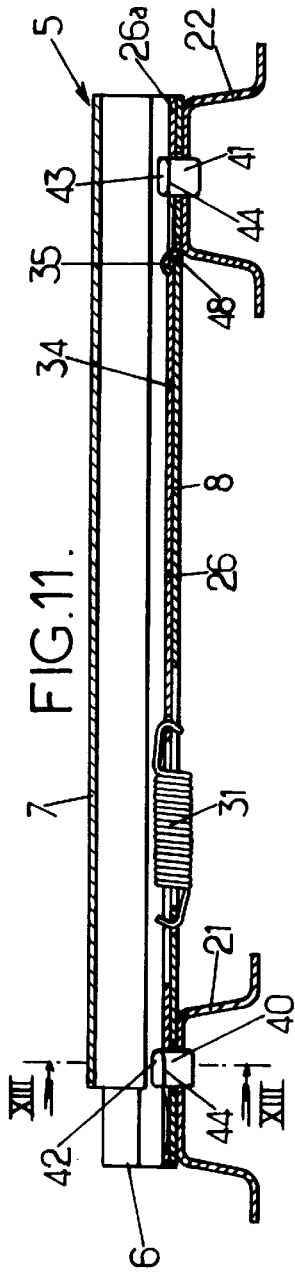
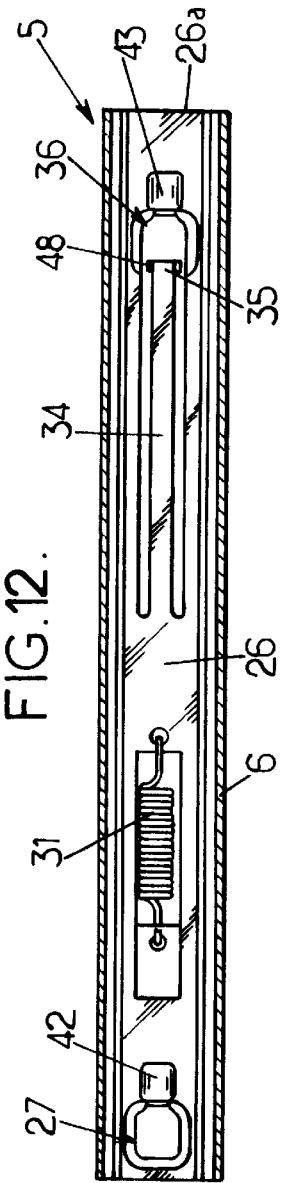

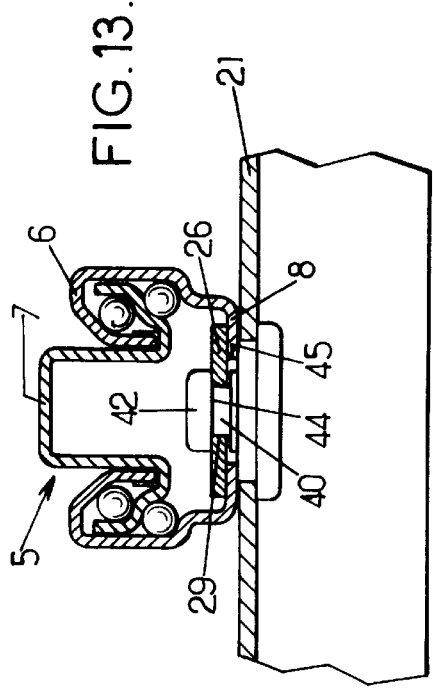
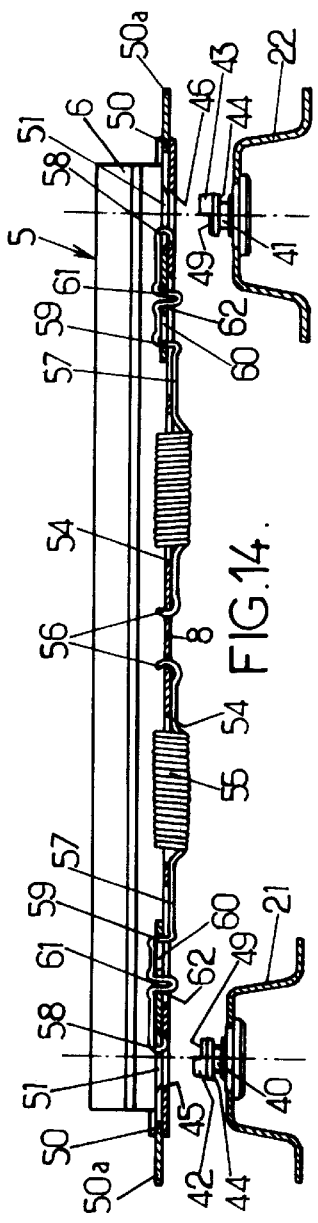
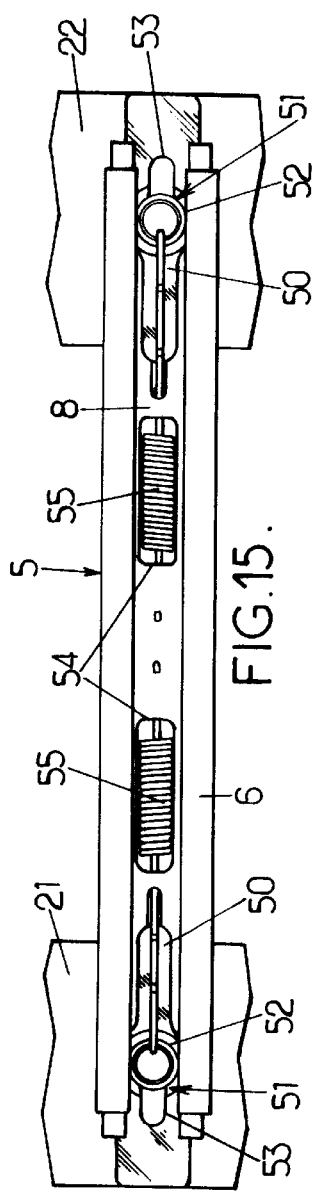

DEVICE FOR FIXING A VEHICLE SEAT, VEHICLE SEAT HAVING SUCH A DEVICE AND A SLIDE BAR FOR SUCH A SEAT

FIELD OF THE INVENTION

The present invention relates to devices for fixing vehicle seats, vehicle seats having such devices and slide bars for such vehicle seats.

More specifically, the invention relates to a fixing device for mounting the seat part of a seat on a vehicle floor, this fixing device comprising:

a base which is designed to be joined to the seat part, the floor and the base being referred to hereafter one as a first supporting element and the other as a second supporting element, positioning means joined to the first supporting element and complementary positioning means joined to the second supporting element, designed to cooperate reciprocally by a simple vertical interlocking action for horizontally positioning the base on the vehicle floor, at least one rigid anchoring member joined to the first supporting element, at least one latch, slidably mounted on the second supporting element between a locking position on the one hand in which said latch may co-operate with the anchoring member to immobilize the base vertically on the vehicle floor and, on the other, a released position in which the latch does not immobilize the base on the vehicle floor, and resilient means for biasing the latch into the locking position.

BACKGROUND OF THE INVENTION

Document GB-A-2 008 938 describes such a fixing device, comprising two latches which are mounted on the base and each of which co-operates with two anchoring members mounted on the vehicle floor. In order to fix the seat to the vehicle floor, the operator must simultaneously position the seat on the anchoring members and displace the two latches into the released position against the action of the resilient means. This fixing device of the prior art is therefore awkward to operate.

OBJECTS AND SUMMARY OF THE INVENTION

The specific objective of the invention is to overcome this disadvantage.

To this end, the invention proposes a fixing device of the type in question which is essentially characterized in that it has at least one trigger which initially maintains the latch in its released position, this trigger being mounted on the second supporting element and being disposed so as to act on the first supporting element when the seat is positioned on the vehicle floor so that it can then be shifted into its locking position under the action of the resilient means.

As a result of these features, the operation of fixing the base to the vehicle floor is simple and quick since the operator simply has to locate the seat vertically on the vehicle floor in a single movement.

Furthermore, the fixing device proposed by the invention is simple and inexpensive.

In preferred embodiments of the invention, one and/or the other of following features may be incorporated:

the trigger is borne by the latch and has a hooking finger which can be displaced between:

on the one hand a stand-by position in which said hooking finger is hooked onto the second supporting element, and on the other a clear position in which the hooking finger is not hooked into the second supporting element, the hooking finger, when in the stand-by position, being disposed so that it acts on the anchoring member when the base is positioned on the vehicle floor so that the hooking finger can then be displaced from its stand-by position to its clear position, releasing the latch;

the second supporting element has a slot which is designed to receive the hooking finger when the latch is in the locking position so that it will then block this latch;

the latch is of a metal plate design, out of which at least one flexible tongue is cut so as to form the trigger, this tongue extending as far as a folded-back end which forms the hooking finger of the trigger;

the resilient means comprise at least one extension spring having a flexible end branch forming the trigger, this end branch being fixed to the latch and extending as far as a folded-back end forming the hooking finger of the trigger;

the anchoring member is a vertical pin which has a shoulder and which engages in a slot of the second supporting element whilst the latch is designed as a horizontal plate with at least one oblong hole cut out therefrom, this oblong hole having a wide end which is extended by a narrower zone, the wide end of the oblong hole being disposed so as to coincide with the slot of the second supporting element when the latch is in its released position, to allow the vertical pin to engage in said slot, and the narrow zone of the oblong hole being designed to locate on the shoulder of the vertical pin when the latch is in its locking position;

the fixing device has at least two of said anchoring members, which are designed to locate vertically in two slots provided in the second supporting element, these anchoring members forming at least part of said positioning means and these slots forming at least part of said complementary positioning means;

the fixing device has at least two anchoring members co-operating with a same latch;

the fixing device has at least two anchoring members, each co-operating with a latch;

the latch slides in a guide and has a viewing zone which is visible on the exterior of the guide at least when the latch is in its released position;

the first supporting element consists of the base and the second support element is the vehicle floor, the first supporting element is the vehicle floor and the second supporting element is the base.

In addition, another object of the invention is a vehicle seat designed to be mounted on a vehicle floor by means of at least one fixing device as defined above, this seat comprising:

said base, fixed to the seat part, said complementary positioning means, said latch, said resilient means, and said trigger.

Finally, another object of the invention is to provide a slide bar for regulating the longitudinal position of a vehicle seat as defined above, this slide bar having at least one fixed section belonging to the base and bearing said complementary positioning means, said latch, said resilient means and said trigger. Advantageously, the fixed section has a substantially U-shaped cross section, open at the top, with a horizontal base and two vertical wings, the latch being slidably mounted in the fixed section on the base of this section.

BRIEF DESCRIPTION OF THE DRAWINGS

Other features and advantages of the invention will become clear from the following description of several of its embodiments, given by way of example and not restrictive in any respect, with reference to the appended drawing.

Of the appended drawings,

FIG. 1 is a schematic view of a vehicle seat fitted with slide bars which may be fixed to the vehicle floor by a fixing device as proposed by the invention, FIG. 2 is a perspective view of one of the slide bars of the seat illustrated in FIG. 1, provided with a first embodiment of a fixing device proposed by the invention, before being fixed to the vehicle floor, FIG. 3 is a view in longitudinal, vertical section of the slide bar illustrated in FIG. 2, again before being fixed to the vehicle floor, FIG. 4 is a plan view of the latch belonging to the slide bar of FIGS. 2 and 3, FIG. 5 is a view similar to that of FIG. 3, after the slide bar has been fixed to the vehicle floor, FIG. 6 is a section along the line VI—VI of FIG. 5, FIGS. 7 and 8 are perspective views, from above and below respectively, of a slide bar fitted with a fixing device proposed by the invention in a second embodiment of the invention, the slide bar being illustrated before it is fixed to the vehicle floor and the slide bar of FIG. 7 being shown without its mobile section in order to provide greater clarity, FIG. 9 is a view in longitudinal section of the slide bar of FIGS. 7 and 8, again before being fixed to the vehicle floor, FIG. 10 is a plan view of the slide bar of FIG. 9, without its mobile section, FIG. 11 is a view similar to that of FIG. 9, showing the slide bar after it has been fixed to the vehicle floor, FIG. 12 is a plan view of the slide bar of FIG. 11, without its mobile section, FIG. 13 is a view in section along the line XIII—XIII of FIG. 11, FIG. 14 is a view in longitudinal section of a slide bar fitted with a third embodiment of a fixing device proposed by the invention, the slide bar being shown before it is fixed to the vehicle floor and without its mobile section, and FIG. 15 is a plan view of the slide bar of FIG. 14.

MORE DETAILED DESCRIPTION

Figure 8:
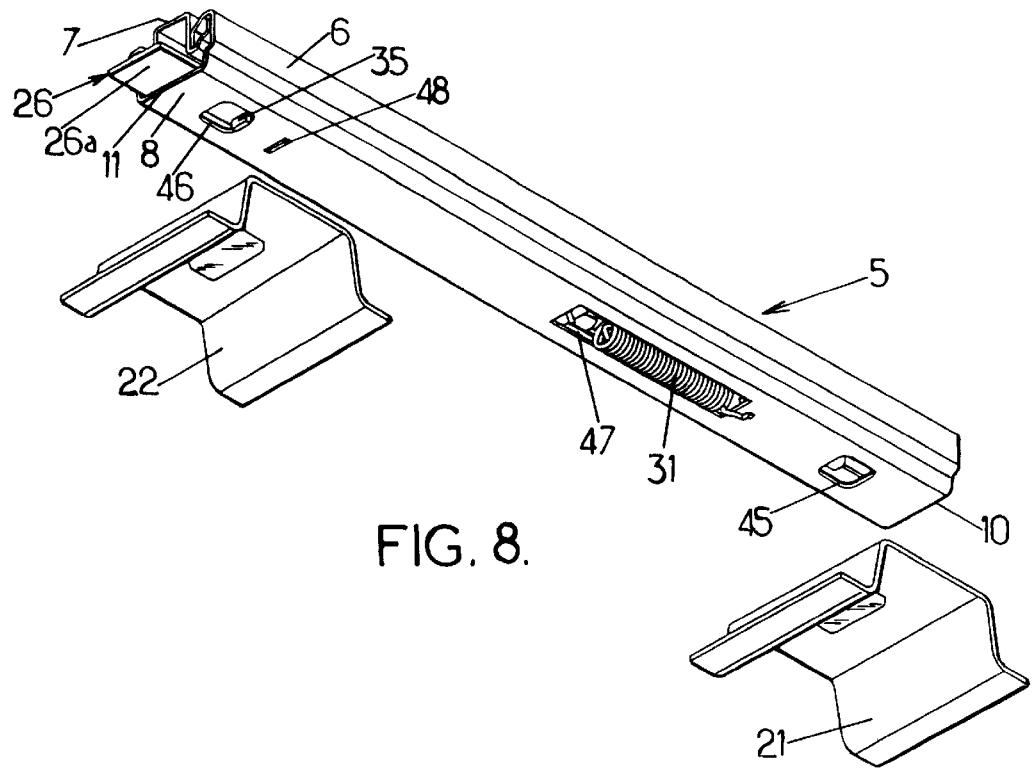

The same references are used to denote identical or similar elements in the various drawings.

FIG. 1 represents a vehicle seat 1, in particular a front seat of a motor vehicle, which has a back 2 mounted on a seat 3. The seat is fixed to the floor 4 of the vehicle by means of a base comprising two parallel, longitudinal slide bars 5, only one of which is visible in FIG. 1.

Each of the slide bars 5 has, on the one hand, a fixed metal section 6 which is joined to the vehicle floor 4 and, on the other, a mobile metal section 7 which is mounted so as to slide along the fixed section 6 to allow a user to adjust the longitudinal position of the seat forwards and backwards.

As illustrated in FIGS. 2 and 3, the fixed section has a substantially U-shaped cross-section open at the top, with a base 8 and two vertical side wings 9.

The front 10 and rear 11 ends of the fixed section respectively have front 12 and rear 13 metal anchoring pins, extending vertically downwards. Each of these anchoring pins has an enlarged bottom head 14, 15, delimiting an upwardly oriented shoulder 16.

Furthermore, in the example illustrated, the enlarged head 14 of the front anchoring pin is of a truncated cone shape, flared towards the top, whilst the enlarged head 15 of the rear anchoring pin is of a partially truncated cone shape, provided with a notch forming a downwardly oriented flattened portion 17 which is located immediately below the level of the above-mentioned shoulder 16 and which is disposed towards the front of the head 15.

When the seat 1 is fixed to the vehicle floor 4, these anchoring pins 14, 15 locate in holes 18, 19 provided in a metal support section 20, which extends parallel with the corresponding slide bar 5 and which is fixed to the vehicle floor 4 by two raised metal support feet 21, 22.

The support feet 21, 22, which are designed as transverse metal sections of an upside-down U-shape, each have a cut-out section 21a, 22a underneath the corresponding hole 18, 19 of the support section, the cut-out section 22a of the support foot 22 also extending towards the front.

Furthermore, the support section 20 has a stamped, cutaway central portion 23 which is raised slightly relative to the side edges 24 and the ends 25 of said support section.

The central part 23 of the support section therefore forms a guide for a latch 26, which is designed as a metal, horizontal plate in the form of a rule and which slides longitudinally parallel with the corresponding slide bar 5, being supported on the ends 25 of the support section 20.

As illustrated in FIGS. 3 and 4, the latch 26 has an oblong hole 27 at its front end, which has a relatively wide front part 28 extended at the rear by a relatively narrow part 29.

At the rear of the oblong hole 27, a cut-out piece 30, in this case of a rectangular shape, is cut into the latch 26 in order to receive a metal helical spring 31, which is also received in a rectangular cut-out section 32 of the support section 20 and the ends of which are hooked respectively onto the support section 20 and the latch 26 in order to bias the latch forwards.

Finally, at the rear of the cut-out section 30, the latch 26 also has two parallel longitudinal slots 33, delimiting between them a flexible tongue 34 or trigger, which trigger 34 extends towards the rear as far as a free end 23 forming a hooking finger which is folded upwards.

Before the seat 1 is fixed to the vehicle floor, this hooking finger 35 is located in the hole 19 of the support section 20, holding the latch 26 in a released position against the biasing action of the spring 31.

Furthermore, the two slots 33 are joined at the rear of the hooking finger 35 to form an oblong hole 36 having a relatively wide front part 37 which is extended towards the rear by a relatively narrow part 38.

When the latch 26 is in the released position, the wide part 37 of the oblong hole 36 is disposed facing the hole 19 of the support section and the rear part of the cut-out section 22a of the support foot 22.

Consequently, in order to fix the seat 1 to the vehicle floor 4, the operator need only vertically engage the anchoring pins 12, 13 of the two slide bars 5 in the holes 18, 19 of the corresponding support sections.

As may be seen from FIGS. 5 and 6, the enlarged heads 14, 15 of these anchoring pins therefore respectively penetrate the widened parts 28, 37 of the oblong holes 27, 36 of the corresponding latch 26 as well as the cut-out sections 21a to 22a of the support feet 21, 22 (see FIGS. 5 and 6).

As soon as the anchoring pins 12, 13 start to locate vertically in the holes 18, 19, the seat 1 is horizontally positioned on the vehicle floor.

Furthermore, during this movement, the flattened portion 17 of the enlarged head 15 belonging to the rear anchoring pin bears down on the hooking finger 35 of the latch 26, causing this hooking finger to move into a clear position, in which it moves out from the hole 19 of the support section.

The latch 26 is thus released and is displaced forwards by the spring 31 until the hooking finger 35 locates in a cut-out portion 39 provided in the central part of the support section 20 towards the front of the hole 19.

The narrow parts 29, 38 of the oblong holes 27, 36 then locate respectively on the anchoring pins 12, 13, substantially without any clearance, covering the shoulders 16 of these anchoring pins so that the seat 1 is immobilized both horizontally and vertically on the vehicle floor 4.

It should be pointed out that the rear end 26a of the latch which initially projected out from the rear of the support section 20 (see FIGS. 2 and 3) is then substantially aligned with the rear end of said support section when the latch 26 is in the locked position. This viewing zone 26a allows the operator to make sure that the locking action has been effected correctly.

Figure 7:
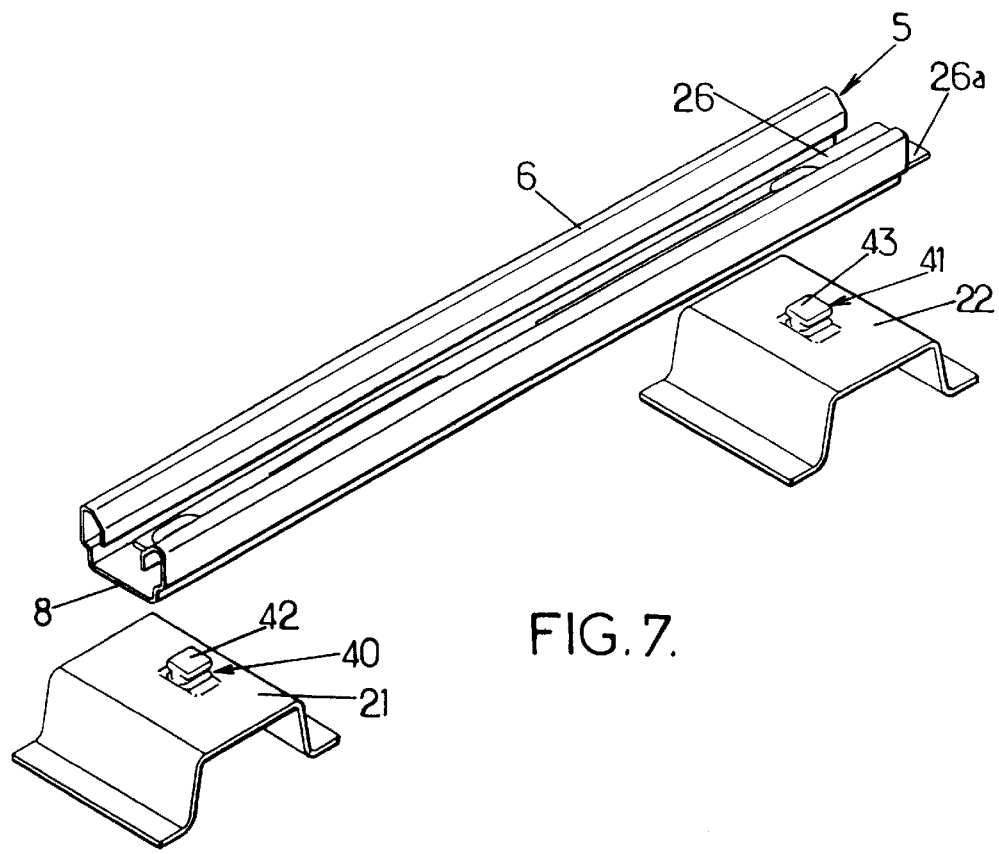

The second embodiment of the invention, illustrated in FIGS. 7 to 13, and the third embodiment, illustrated in FIGS. 14 and 15, are very similar to the first embodiment and will therefore not be described in detail below: only those features which are different from the first embodiment will be looked at in detail.

In the second embodiment of the invention, illustrated in FIGS. 7 to 10, the anchoring pins 40, 41 are not fixed underneath the base of the fixed section of the slide bar but directly on the support feet 21, 22, which feet no longer have the above-mentioned cut-out portions 21a and 22a.

The anchoring pins 40, 41 each extend upwards to a flattened, enlarged head 42, 43 respectively, which forms a bottom shoulder 44.

The anchoring pins 40, 41 locate in holes 45, 46 cut out from the base 8 of the fixed section of each slide bar.

Furthermore, inside the slide bar 5, a latch 26 similar to that described above is slidably mounted on the base 8 of the fixed section 6. This latch 26 is biased forwards by the above-mentioned spring 31, which is engaged in the cut-out portion 30 of the latch 26 and in a cut-out portion 47 of the base 8.

In the released position, the hooking finger 35 of the flexible tongue 34 of the latch 26 is engaged in the hole 46 of the base of the fixed section, which blocks the latch 26.

Moreover, in this position, the rear end 26a of the latch projects beyond the rear of the fixed section 6.

When an operator wants to fix the seat 1 on the vehicle floor, he merely has to position the holes 45, 46 of the two slide bars of the seat above the anchoring pins 40, 41 and then allow the seat to lower so that said anchoring pins engage in the holes 45, 46 and in the wide parts 28, 37 of the oblong holes 27, 36 of the latch.

During this displacement, the hooking finger 35 of the latch is raised by the enlarged head 43 of the anchoring pin 41 so that this hooking finger is released from the corresponding hole 46.

As illustrated in FIGS. 11 to 13, the latch 26 is then released and may be displaced forwards under the action of the spring 31 so that the narrow parts 29, 38 of the oblong holes 27, 36 locate underneath the shoulders 44 of the enlarged heads of the two anchoring pins.

The seat 1 is then immobilized on the vehicle floor both horizontally and vertically.

In addition, the rear end 26a of the latch is fully engaged in the fixed section 6 of the slide bar, which enables the operator to make sure that the locking action has been effected correctly.

At the end of this displacement, the hooking finger 35 of the latch preferably locates in a cut-out section 48 provided in the base 8 of the fixed section of the slide bar so that the latch 26 is blocked.

The third embodiment of the invention illustrated in FIGS. 14 and 15 is similar to the second embodiment since the anchoring pins 40, 41 are borne by the support feet 21, 22 Only the shape of these anchoring pins differs from those of FIGS. 7 to 13 since the enlarged head 42, 43 of said anchoring pins is designed in the shape of a partially truncated cone with a notch forming a flattened section 49 facing upwards, which flattened section is located on a level relatively close to that of the corresponding shoulder 44.

Furthermore, slidably mounted on the base 8 of the fixed section of the slide bar are two symmetrical latches 50, each of which is provided as a flat metal plate having an oblong hole 51 with a wide part 52 and a narrow part 53, the oblong hole 51 of each latch 50 being arranged so as to coincide with one of the holes 45, 46 of the fixed section.

Accordingly, a particularly reliable locking action is produced since a separate latch 50 is provided for each anchoring pin 40, 41.

The base 8 of the fixed section of each slide bar has two rectangular cut-out portions 54 each of which receives a helical extension spring 55, which helical spring has a first end branch 56 fixed to the base 8 of the fixed section and a second, flexible end branch 57.

This second end branch 57 is fixed to the corresponding latch 50 in an intermediate position along its length and extends as far as a folded-back end forming a hooking finger 58 which is initially engaged in the corresponding hole 45, 46 of the base 8 of the fixed section, which holds each latch 50 in a released position with the wide part 52 of its oblong hole arranged to coincide with the corresponding hole 45, 46 of the base of the fixed section.

In the specific example illustrated in FIGS. 14 and 15, the branch 57 of each spring is attached to the corresponding latch 50 by means of:
  an offset portion 59 of the branch 57 which passes up through a recess 60 of the latch 50,
  and a fold 61 in said end branch 57 which is forcibly engaged downwards in a cut-out section 62 of the latch.

When the seat 1 is placed on the vehicle floor, the flat portions 49 of the enlarged heads 42, 43 of the anchoring pins raise the hooking fingers 58, releasing the latches 50 so that the narrow parts 53 of the oblong holes of the latches engage underneath the enlarged heads 42, 43 of said anchoring pins, immobilizing the seat on the floor.

Furthermore, as in the preceding examples, the ends 50a of the latches initially project to the exterior of the fixed section 6 of each slide bar and are then retracted in the interior of said fixed sections, which allows the operator to make sure that the seat is correctly locked on the floor.

I claim:

1. A fixing device comprising:

first and second supporting elements adapted to co-operate by mutual engagement, at least one rigid anchoring member belonging to said supporting element, at least one latch slidably mounted on said second supporting element between a locking position in which said latch is adapted to co-operate with said anchoring member to immobilize the first supporting element, and a released position in which said latch does not immobilize said first supporting element, said latch being resiliently biassed toward its locking position, wherein said fixing device further includes at least one trigger which is adapted to hold the latch in its released position, said trigger being mounted on the second supporting element and being adapted to be displaced by the first supporting element for releasing said latch when said first and second supporting elements co-operate by mutual engagement.

2. A fixing device according to claim 1, wherein said trigger is borne by the latch and has a hooking finger which is displaceable between:

a stand-by position in which said hooking finger is hooked onto the second supporting element, and a clear position in which the hooking finger is not hooked onto the second supporting element, said hooking finger being adapted to be displaced by said anchoring member from the stand-by position to the clear position when said first and second supporting members co-operate by mutual engagement.

3. A fixing device according to claim 2, wherein the second supporting element has a slot which is adapted to receive the hooking finger when the latch is in the locked position, for blocking said latch.

4. A fixing device according to claim 2, wherein the latch includes a metal plate having at least one cut out flexible tongue forming the trigger, said tongue including a folded end which forms said hooking finger.

5. A fixing device according to claim 2, wherein said trigger includes a resiliently flexible end branch, said end branch being fixed to the latch and extending up to a folded end forming said hooking finger.

6. A fixing device according to claim 1, wherein the first supporting element includes a first pin constituting said anchoring member, said first pin having a shoulder and being adapted to engage in a first slot provided in the second supporting element, said latch including a plate which is perpendicular to said first pin and which includes at least a first oblong hole, said first oblong hole having a wide end which is extended by a narrower zone, the wide end of the first oblong hole being disposed to coincide with the first slot of the second supporting element when the latch is in the released position for allowing said first pin to engage in said first slot, and the narrow zone of the first oblong hole being designed to engage on the shoulder of the first pin for locking said first pin when the latch is in its locked position.

7. A fixing device according to claim 6, wherein the first supporting element further includes a second pin which is parallel to the first pin and which is adapted to engage in a second slot provided in the second supporting element.

8. A fixing device according to claim 7, wherein said second pin includes a shoulder and said plate includes at least a second oblong hole, said second oblong hole having a wide end which is extended by a narrower zone, the wide end of the second oblong hole being disposed to coincide with the second slot of the second supporting element when the latch is in the released position for allowing said second pin to engage in said second slot, and the narrow zone of the second oblong hole being designed to engage on the shoulder of the second pin for locking said pin when the latch is in its locked position.

9. A fixing device according to claim 1, having at least two anchoring members each co-operating with a latch.

10. A fixing device according to claim 1, wherein the latch slides in a guide and has a viewing zone which is visible from the exterior of the guide at least when the lock is in its released position.

11. A fixing device according to claim 1, wherein the first supporting element is a seat base and the second supporting element is a vehicle floor.

12. A fixing device according to claim 11 or claim 11, wherein the seat base supports a vehicle seat.

13. A fixing device according to claim 11 or claim 12, wherein the seat base is a slide bar for adjusting the longitudinal position of a vehicle seat.

14. A fixing device according to claim 1, wherein the first supporting element is a vehicle floor and the second supporting element is a seat base.

15. A fixing device according to claim 14, wherein the seat base is a slide bar for adjusting the longitudinal position of a vehicle seat and wherein said slide bar comprises at least one fixed section which bears said latch and said trigger.

16. A fixing device as claimed in claim 15, wherein said fixed section has a substantially U-shaped cross section with a base and two wings, the latch being slidably mounted on said base, between said wings.

* * * * *